(12) United States Patent
Jo

(10) Patent No.: US 11,224,152 B2
(45) Date of Patent: Jan. 18, 2022

(54) ANGLE ADJUSTABLE CONNECTING PART FOR FARM EQUIPMENT AND HAND TOOLS

(71) Applicant: Jun Rae Jo, Daejeon (KR)

(72) Inventor: Jun Rae Jo, Daejeon (KR)

(*) Notice: Subject to any disclaimer, the term of this patent is extended or adjusted under 35 U.S.C. 154(b) by 664 days.

(21) Appl. No.: 15/737,284

(22) PCT Filed: Jun. 15, 2016

(86) PCT No.: PCT/KR2016/006354
§ 371 (c)(1),
(2) Date: Dec. 16, 2017

(87) PCT Pub. No.: WO2016/204511
PCT Pub. Date: Dec. 22, 2016

(65) Prior Publication Data
US 2018/0168091 A1  Jun. 21, 2018

(30) Foreign Application Priority Data

Jun. 16, 2015  (KR) .................. 10-2015-0085002

(51) Int. Cl.
*A01B 1/22* (2006.01)
*B25G 3/04* (2006.01)
(Continued)

(52) U.S. Cl.
CPC .............. *A01B 1/222* (2013.01); *A01B 1/225* (2013.01); *A01D 1/12* (2013.01); *B25F 1/02* (2013.01);
(Continued)

(58) Field of Classification Search
CPC ..... Y10T 403/32327; Y10T 403/32336; Y10T 403/32361; Y10T 403/32418;
(Continued)

(56) References Cited

U.S. PATENT DOCUMENTS 261,894 A * 8/1882 Albers .................. A01B 1/225
294/53.5
841,488 A * 1/1907 Doidge .................. A01B 1/222
172/373
(Continued)

FOREIGN PATENT DOCUMENTS

CN      2862618 Y    1/2007
CN    201409279 Y    2/2010
(Continued)

*Primary Examiner* — Matthew R McMahon
(74) *Attorney, Agent, or Firm* — Maschoff Brennan

(57) ABSTRACT

An angle adjustable connecting part for farm equipment and hand tools easily detaches from a working part of farm equipment and a hand tool from a sack. A connecting part is formed on the front end of a working part of farm equipment or hand tool. A connecting part is also formed on the front end of a sack, thereby coupling the working part and the sack. The connecting part has a fixing hole formed in the center thereof, and multiple angle adjusting holes are formed concentrically outward. A fixing hole is formed at the center outward from the connecting part. A fixing plate has a fixing protrusion inserted into the angle adjusting hole. When a fixing screw is fixed to the fixing plate and the fixing hole of the connecting part, the fixing protrusion of the fixing plate is fixed to an angle adjusting hole of the connecting part.

3 Claims, 14 Drawing Sheets

(51) Int. Cl.
*B25G 3/26* (2006.01)
*B25G 3/38* (2006.01)
*B25F 1/02* (2006.01)
*A01D 1/12* (2006.01)
*B25G 3/36* (2006.01)
*A01D 1/04* (2006.01)

(52) U.S. Cl.
CPC .............. *B25G 3/04* (2013.01); *B25G 3/26* (2013.01); *B25G 3/36* (2013.01); *B25G 3/38* (2013.01); *A01D 1/04* (2013.01); *Y10T 403/32361* (2015.01)

(58) Field of Classification Search
CPC .......... A01B 1/222; A01B 1/225; B25G 3/04; B25G 3/36; B25G 3/26; B25G 3/38; A01D 1/04; A01D 1/12; B25F 1/02
See application file for complete search history.

(56) References Cited

U.S. PATENT DOCUMENTS

| | | | | |
|---|---|---|---|---|
| 1,379,205 | A * | 5/1921 | Ogden | A01D 1/04 30/309 |
| 1,687,200 | A * | 10/1928 | Goodman | A01B 1/222 172/373 |
| 3,932,715 | A * | 1/1976 | Milianowicz | H01H 31/02 200/48 SB |
| 4,339,844 | A * | 7/1982 | Shatters | B60J 5/0487 16/82 |
| 4,890,950 | A * | 1/1990 | Yoo | E06C 1/32 16/328 |
| 5,009,292 | A * | 4/1991 | Hoffman, Jr. | F16D 65/18 188/196 M |
| 5,165,144 | A * | 11/1992 | Nisenbaum | B25G 1/00 15/145 |
| 5,190,391 | A * | 3/1993 | Huong | F16C 11/00 16/342 |
| 5,620,272 | A * | 4/1997 | Sheng | E05D 11/1007 182/163 |
| 5,713,633 | A * | 2/1998 | Lu | B60N 2/847 297/364 |
| 5,913,351 | A * | 6/1999 | Miura | G06F 1/1616 16/340 |
| 6,189,420 | B1 * | 2/2001 | Shiao | B25G 1/066 403/84 |
| 6,343,406 | B1 * | 2/2002 | Yeh | E05D 11/1007 16/328 |
| 6,711,780 | B2 * | 3/2004 | Lee | E06C 1/32 16/326 |
| 7,213,294 | B2 * | 5/2007 | Karroll | B05C 17/022 15/144.1 |
| 7,341,392 | B2 * | 3/2008 | Yeh | E06C 1/32 182/163 |
| 8,535,128 | B2 * | 9/2013 | Chwala | F24F 7/025 454/354 |
| 8,869,658 | B2 * | 10/2014 | Chou | B25G 1/007 81/177.8 |
| 2005/0134064 | A1 * | 6/2005 | Nies | B25G 1/06 294/51 |
| 2009/0194301 | A1 | 8/2009 | Grubb | |
| 2012/0324665 | A1 * | 12/2012 | Miller | B25G 3/38 15/144.1 |
| 2016/0208981 | A1 * | 7/2016 | Kaesemeyer | B05B 9/007 |

FOREIGN PATENT DOCUMENTS

| | | |
|---|---|---|
| EP | 2 730 154 A1 | 5/2014 |
| EP | 2 730 154 B1 | 6/2017 |
| KR | 20 1982 0001623 | 6/1981 |
| KR | 10 2009 0069909 A | 7/2009 |
| KR | 10 1401596 B1 | 6/2014 |

\* cited by examiner

ANGLE ADJUSTABLE CONNECTING PART FOR FARM EQUIPMENT AND HAND TOOLS

TECHNICAL FIELD

The present invention relates to an angle adjustable connecting part for farm equipment and hand tools that facilitates connection and disconnection of working parts of farm equipment and hand tools by requiring only the blade to be replaced and allows the working part and the handle to be positioned at various angles according to the working conditions at the worksite, thereby achieving broad applicability.

BACKGROUND ART

Since a farm tool used for agriculture has a working part made of metal and a handle fixedly connected to the working part, it is difficult to replace the working part alone with a new one. Further, since each kind of farm equipment has a unique connecting part, different farm tools are not compatible with each other. For example, when the blade of a sickle becomes dull or chipped, it is difficult to replace the blade with a new blade at the worksite. In addition, when a longer handle is needed for a hoe, the handle of the sickle cannot be connected to the working part of the hoe.

In addition, for the conventional farm equipment, the angle cannot be appropriately adjusted according to the work environment or the physical condition of the worker due to fixed coupling between the working part and the handle, and the length of the handle cannot be adjusted. For example, when a user desires to use a medicinal herb-gathering hoe having a short handle, which cannot be replaced with a new one, in a standing position, he or she may not use the hoe due to the small angle of the blade of the hoe with respect to the handle, and it is difficult to replace the handle with a longer handle.

Since the conventional farm equipment is manufactured by fixedly coupling the working part and the handle, it is difficult to replace the working part with a new one. Further, since the angle and length of the handle are fixed, it is difficult to change the length of the handle. Most conventional farm tools do not have a function of adjusting the angle between the working part and the handle. Even in the case of the entrenching shovel, which employs both a shovel and a mattock, which form an adjustable angle therebetween, only angle adjustment in two or three steps is allowed.

DISCLOSURE

Technical Problem

The present invention has been made to solve a problem that various kinds of farm equipment and hand tools come with a handle fixed to a working part or allow angle adjustment only within a predetermined range, particularly do not allow the length of the handle to be adjusted, and a problem that, even if an angle adjustable connecting part is provided, it does not have broad applicability since the angle adjustment method and structure vary among the types of the farm equipment and hand tools, and it is one object of the present invention to provide a versatile connecting part that allows detachable connection and adjustment of an angle between a working part and a handle of farm equipment and hand tools such that the working part and the handle can be replaced and the angle between the working part and the handle can be adjusted as desired.

Technical Solution

The present invention is directed to an angle adjustable connecting part for farm equipment and hand tools that facilitates connection and disconnection of working parts of farm equipment and hand tools by requiring only the blade to be replaced and allows the working part and the handle to be positioned at various angles according to the working conditions at the worksite, thereby achieving versatile applications.

In one aspect of the present invention, the angle adjustable connecting part includes a connecting part formed at a tip of the working part of a farm tool or a hand tool and a connecting part fixed to a tip of the handle to allow the working part and the handle to be coupled to each other by the connecting parts, each of the connecting parts having a fixing hole formed at a center thereof and a plurality of angle adjustment holes arranged along a circumference of a circle centered at the fixing hole, a fixing plate having a fixing hole formed at a center thereof and a fixing projection formed at an outer side thereof to be fitted into the angle adjustment holes, and a fixing screw fitted into and fixed to the fixing holes to fix the fixing projection of the fixing plate fitted into the angle adjustment holes of the connecting parts, wherein, after the fixing screw is loosened, the connecting parts is turned to form a desired angle between the working part and the handle, and the fixing projection of the fixing plate is fitted into the angle adjustment holes and immovably fixed using the fixing screw.

In the present invention, various kinds of working parts may be connected to one handle by unifying the connecting parts for connecting the farm tools or the handles, or handles of different lengths may be connected to one working part. The angle may be adjusted by varying the angle formed between the angle adjustment holes formed in the connecting parts of the working part and the handle.

Advantageous Effects

According to the present invention, a working part of a farm tool or a hand tool can be replaced with a new one for a provided handle, and various angles can be easily formed between the working part and the handle by positioning the angle adjustment holes of connecting parts formed on the working part and the handle at different angles. In addition, the lengths of the handle can be selected as desired, and an optimum angle for work can be set through angle adjustment. Therefore, work efficiency may be improved. In particular, a unified connecting part can be applied to all kinds of farm equipment.

That is, various types of farm equipment and hand tools can be connected using the unified connecting part, and angle adjustment that will facilitate work may be implemented.

REFERENCE NUMERALS

Figure 1:
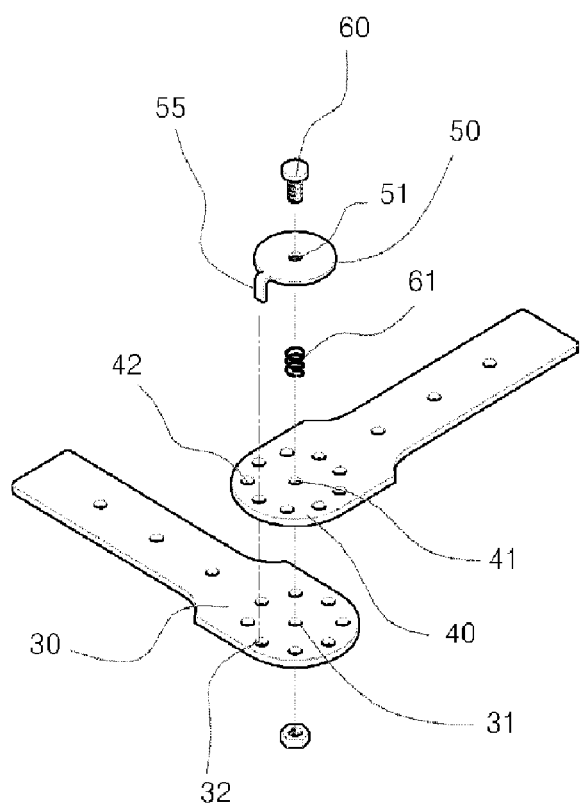
FIG. 1 is an exploded perspective view illustrating a connecting part and a fixing plate.
Figure 2:
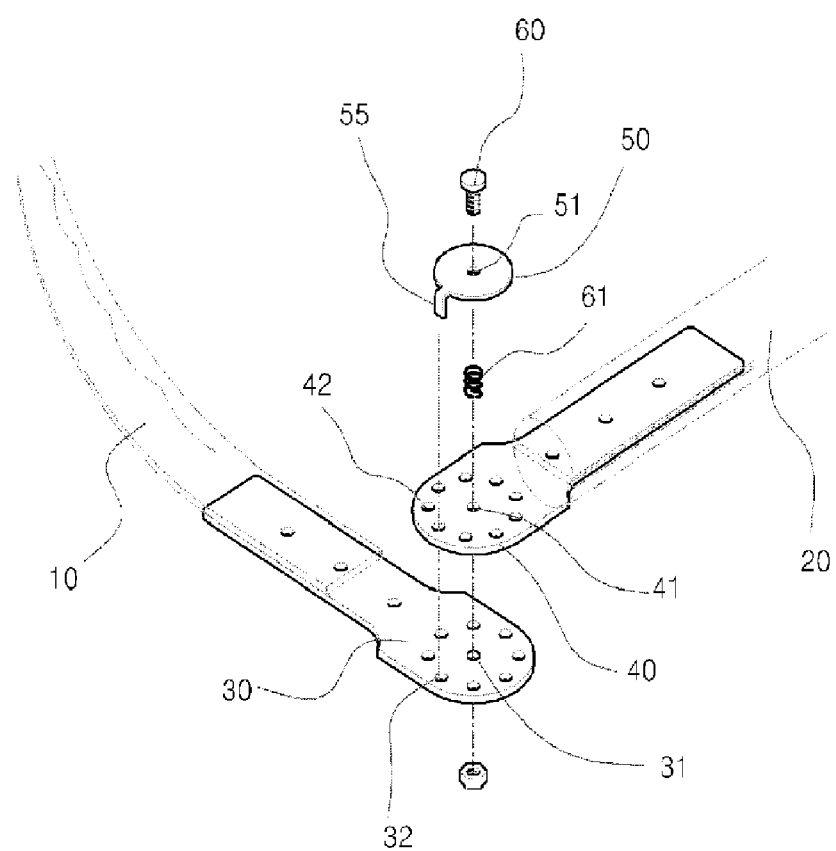
FIG. 2 is an exploded perspective view of an embodiment of the present invention.
Figure 3:
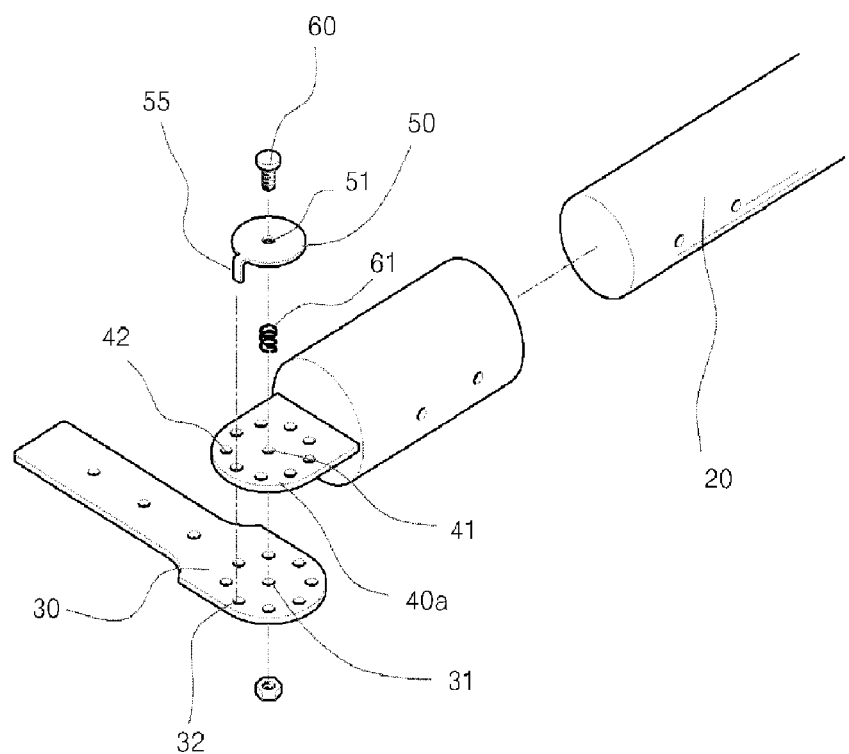
FIG. 3 is an exploded perspective view of another embodiment of the present invention.
Figure 4:
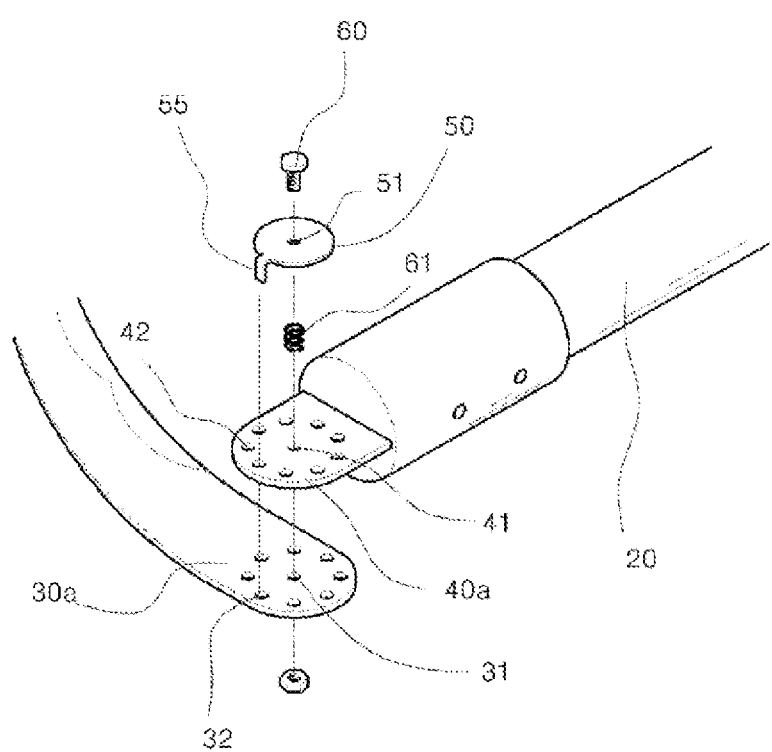
FIG. 4 is an exploded perspective view of yet another embodiment of the present invention.

10: Working part 20: Handle
30, 30a, 40, 40a: Connecting part 31, 41: Fixing hole
32, 42: Angle adjustment hole 33: Fixing projection
50: Fixing plate 51: Fixing hole
55: Fixing projection 60: Fixing screw

BEST MODE

The present invention includes a connecting part 30 fixed to a side of a working part 10 of a farm tool into which a handle 20 of the farm tool is fitted, the connecting part 30 having a fixing hole 31 formed at a center thereof and a plurality of angle adjustment holes 32 arranged on a circle centered at the fixing hole 31; a connecting part 40 fixedly fitted onto a side of the handle 20 into which the working part 10 is fitted, the connecting part 40 having a fixing hole 41 formed at a center thereof and a plurality of angle adjustment holes 42 arranged in a circle centered on the fixing hole 41; a fixing plate 50 having a fixing hole formed at a center thereof and a fixing projection 55 formed at an outer side thereof to be fitted into the angle adjustment holes 32 and 42 of the connecting parts 30 and 40; and a fixing screw 60 fitted into and fixed to the fixing holes 51, 41 and 31 when the fixing projection 55 of the fixing plate 50 is fitted into the angle adjustment holes 32 and 42 of the connecting parts 30 and 40 with the connecting part 30 of the working part 10, the connecting part 40 of the handle 20 and the fixing plate 50 overlapping one another, wherein an angle formed between the angle adjustment holes 32 of the connecting part 30 fixed to the working part 10 is different from an angle formed between the angle adjustment holes 42 of the connecting part 40 fixed to the handle 20, wherein the connecting part 30 fixed to the working part 10 and the connecting part 40 fixed to the handle 20 are arranged overlapping each other, and the fixing plate 50 is arranged on a side surface of the connecting parts 30 and 40 in an overlapping manner.

MODE FOR INVENTION

The present invention relates to fixing working parts of farm tools, such as a sickle, a hoe, a mattock, a pitchfork and a rake, and hand tools, such as a saw, to a handle. A connecting part is provided to each of the tips of the working part and the handle. The connecting parts each have a fixing hole formed at the center thereof and a plurality of angle adjustment holes arranged in a circle centered on the fixing hole. The connecting parts are arranged overlapping each other with the angle between the angle adjustment holes varied, and the fixing plate is arranged on one side of the connecting parts in an overlapping manner with a fixing projection fitted into the fixing holes. Then, the fixing projection is fixed using a fixing screw.

According to an embodiment of the present invention, the connecting part has a fixing hole formed at the center thereof and a plurality of angle adjustment holes arranged around the fixing hole so as to be arranged on the same circle. The connecting part is directly formed on or fixedly connected to the tip of the working part, and another connecting part is fixed to the tip of the handle. The connecting parts are arranged overlapping each other, and the angle adjustment holes thereof arranged at different angles are used to adjust the angle between the working part and the handle. The fixing plate is arranged on one side of the connecting parts in an overlapping manner and fixed using a fixing screw. The fixing plate includes a fixing hole formed at the center thereof and a fixing projection, which is fitted into the angle adjustment holes and is formed on the outer side of the fixing plate in a protruding manner. Thus, after the fixing projection is fitted into the angle adjustment holes of the connecting parts, which are fixed to the working part and the handle with the fixing plate placed on one side of the connecting parts in the overlapping manner, the fixing screw is inserted into the fixing holes and fixed.

In the present invention, the connecting part integrally formed on or fixed to the working part and the connecting part fixed to the tip of the handle are arranged so as to overlap each other on the side surfaces thereof, and the fixing screw, which is inserted into the fixing holes of the connecting parts and fixed by the nut, compresses and fixes a spring interposed between the fixing plate and the connecting parts. Thus, the position of the fixing plate can be changed by pressing the spring with the fixing screw partially loosened. Accordingly, the angle can be easily adjusted.

The outer peripheries of the connecting parts of the present invention are formed to be round in order to ensure free rotation when adjusting the angle with the two connecting parts overlapping each other.

The present invention will be described in detail with reference to the accompanying drawings.

In the present invention, a metal part by which functional operations of farm equipment and hand tools such as a sickle, a hoe, a mattock, a pitchfork, a rake and a saw are performed is referred to as the working part 10. A handle 20, which may be short or long and be formed of wood or metal, will be referred to as the handle 20 in the present invention.

That is, irrespective of whether the worker sits or stands to perform a task, a farm tool and a hand tool are provided with the working part 10 formed of metal and the handle 20, which is gripped by hand and fixes the working part 10. The working surface will be collectively referred to as the working part 10 and the portion gripped by the hand will be collectively referred to as the handle 20.

In connecting the working part 10 with the handle 20, the present invention allows various kinds of working parts to be coupled to the handle 20 and allows the angle between the working part 10 and the handle 20 to be adjusted as desired. According to an embodiment, a connecting part 30 may be integrated with or separately formed and fixed to the working part 10, and a connecting part 40 may be integrated with or separately formed and fixed to the handle 20. A fixed plate 50 having a fixing projection 55 is arranged on a side surface of the connecting parts 30 and 40 in an overlapping manner, and a fixing screw 60 is arranged through the fixing plate 50 and the connecting parts 30 and 40 and fixed.

The connecting part 30, 40 of the present invention is provided with a fixing hole 31, 41 at the center thereof, and a plurality of angle adjustment holes 32, 42 is arranged centered on the fixing hole 31, 41 with a different angle formed therebetween. The outer peripheries of the connecting parts 30 and 40 are rounded such that the connecting parts 30 and 40 can perform angle adjustment without interruption while overlapping each other.

The connecting parts 30 and 40 may be separately fixed to the working part 10 or the handle 20. Alternatively, a connecting part 30a may be formed directly on the working part 10, and a connecting part 40a may be fitted onto the handle 20. It should be noted that the connecting part 30 may be fixed to the working part 10 or the connecting part 30a may be integrated with the working part 10.

Further, it should be noted that the connecting part may be separately fixed to the handle 20, or the connecting part 40a may be integrated with the handle 20.

The fixing plate 50 of the present invention is provided with a fixing hole 51 formed at the center thereof and a fixing projection 55 formed on the outer side thereof so as to be fitted into the angle adjustment holes 32 and 42 of the connecting parts 30 and 40. The fixing plate may be replaced with a bolt and a nut having the same function. The fixing plate 50 is elastically supported by a spring 61. The spring 61 is compressed and fixed with the fixing projection 55 of the fixing plate 50 inserted into holes. The fixing projection 55 is retrieved from the angle adjustment holes 32 and 42 without the fixing screw 60 being fully loosened. Then, the connecting parts 30 and 40 are adjusted to a desired angle, and then the fixing projection is inserted into the angle adjustment holes 32 and 42 with the spring 61 compressed. Thus, it is not necessary to completely unscrew and tighten the nut.

Figure 5:
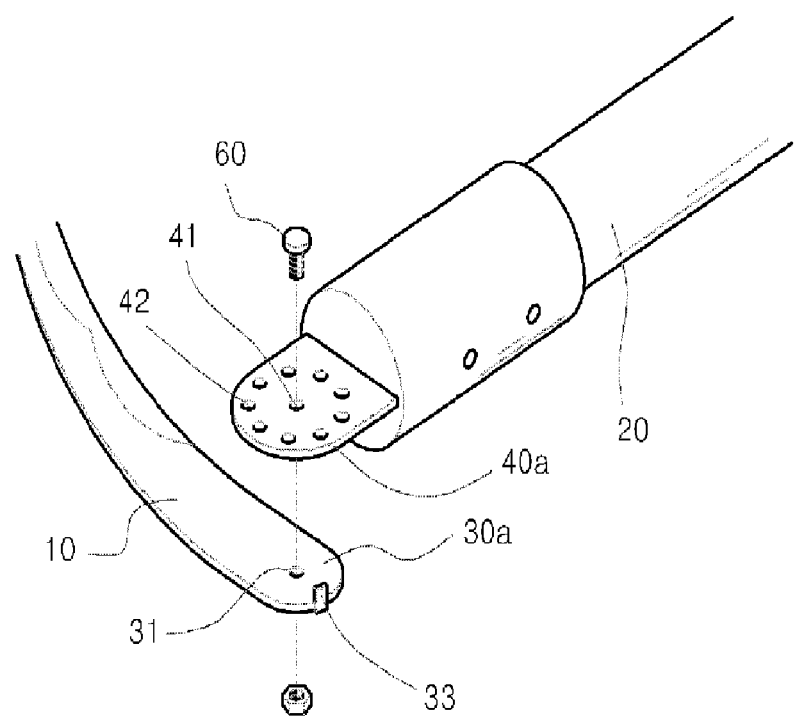
FIG. 5 is an exploded perspective view of a coupling part according to an embodiment of the present invention.
Figure 6:
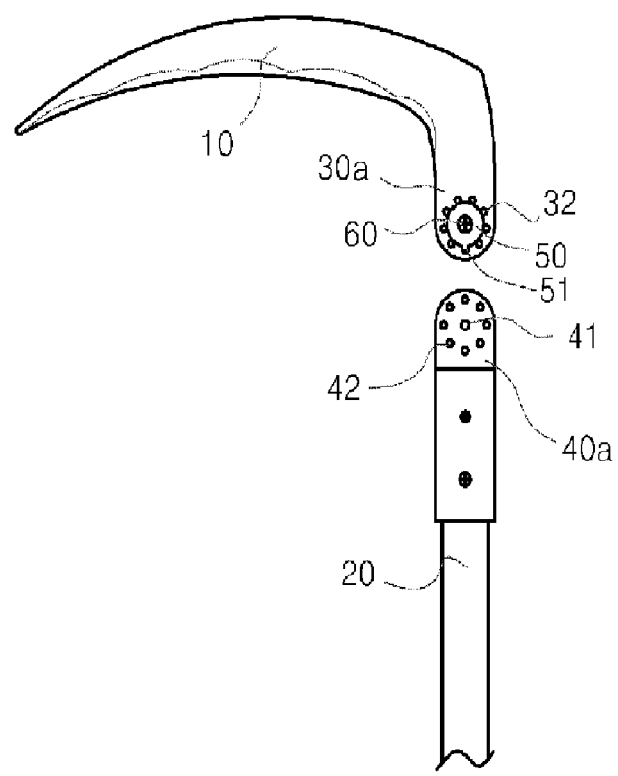
FIG. 6 is a front view illustrating the present invention prior to coupling.
Figure 7:
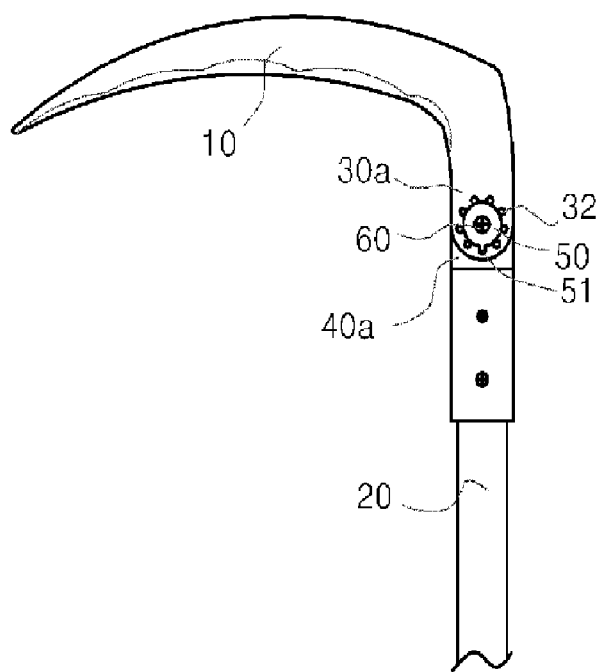
FIG. 7 is a front view illustrating the present invention after coupling.
Figure 8:
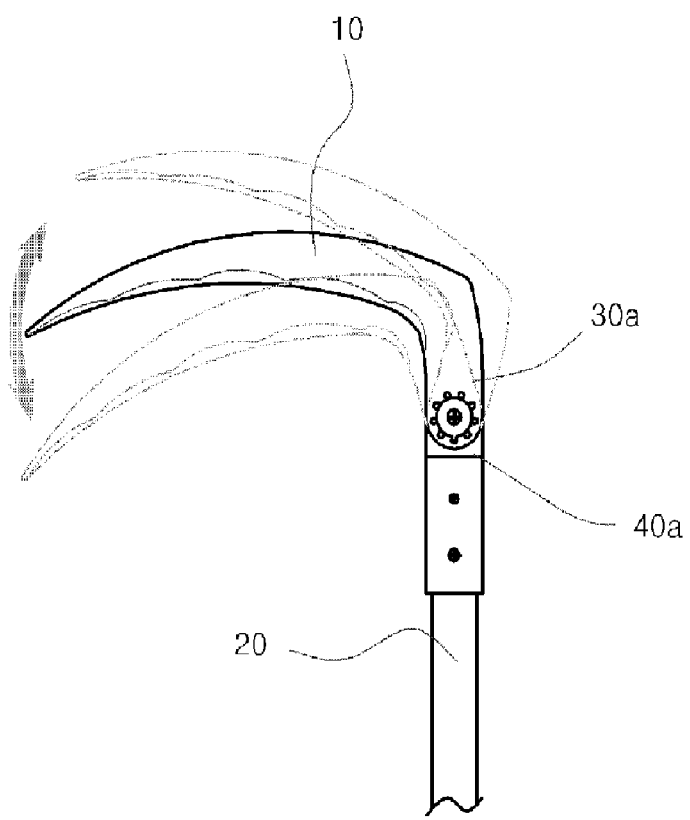
FIG. 8 is a front view illustrating angle adjustment of the present invention.
Figure 9:
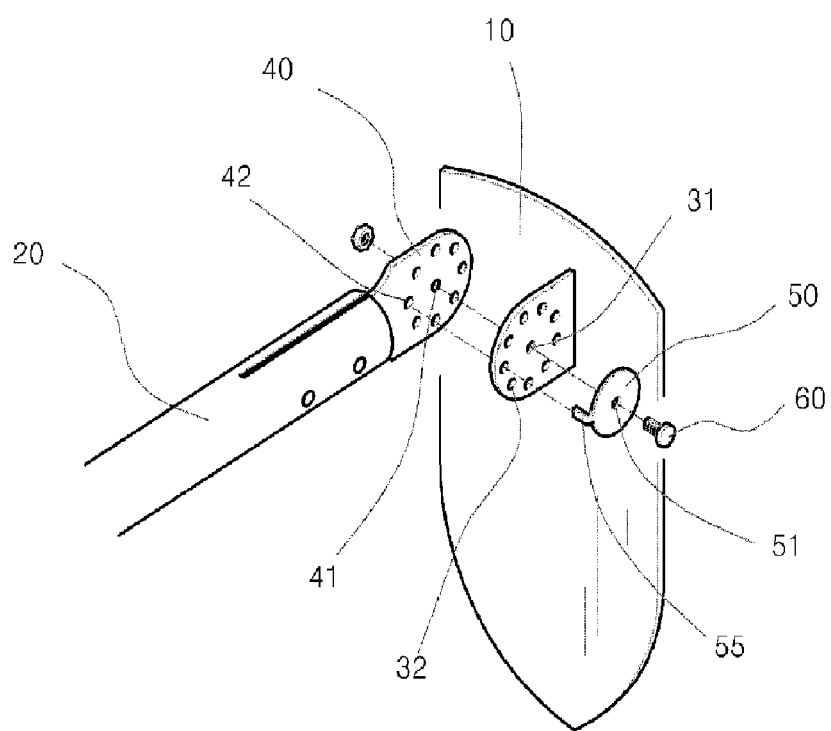
FIG. 9 is an exploded perspective view illustrating another usage of the present invention.
Figure 10:
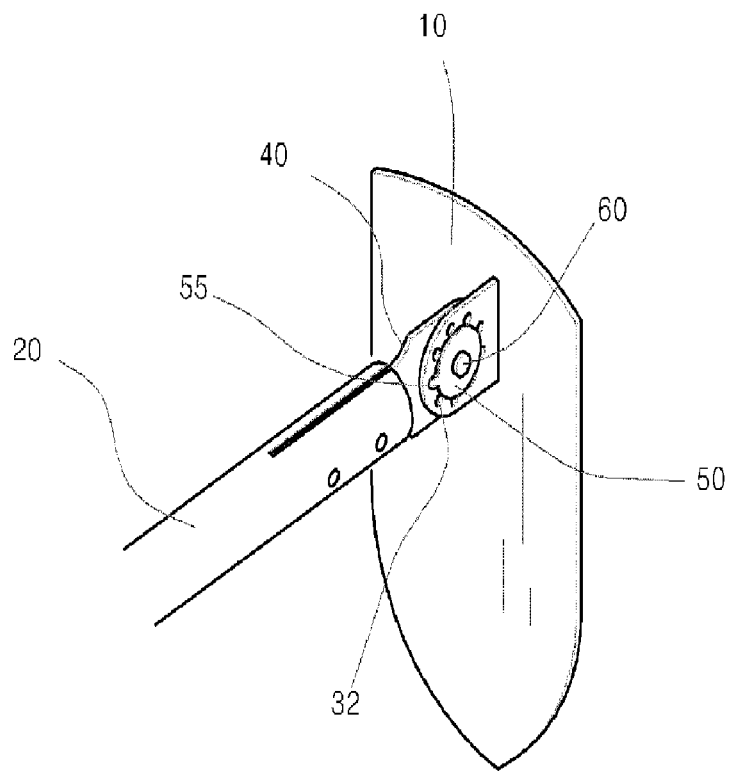
FIG. 10 is a perspective view illustrating another usage of the present invention.
Figure 11:
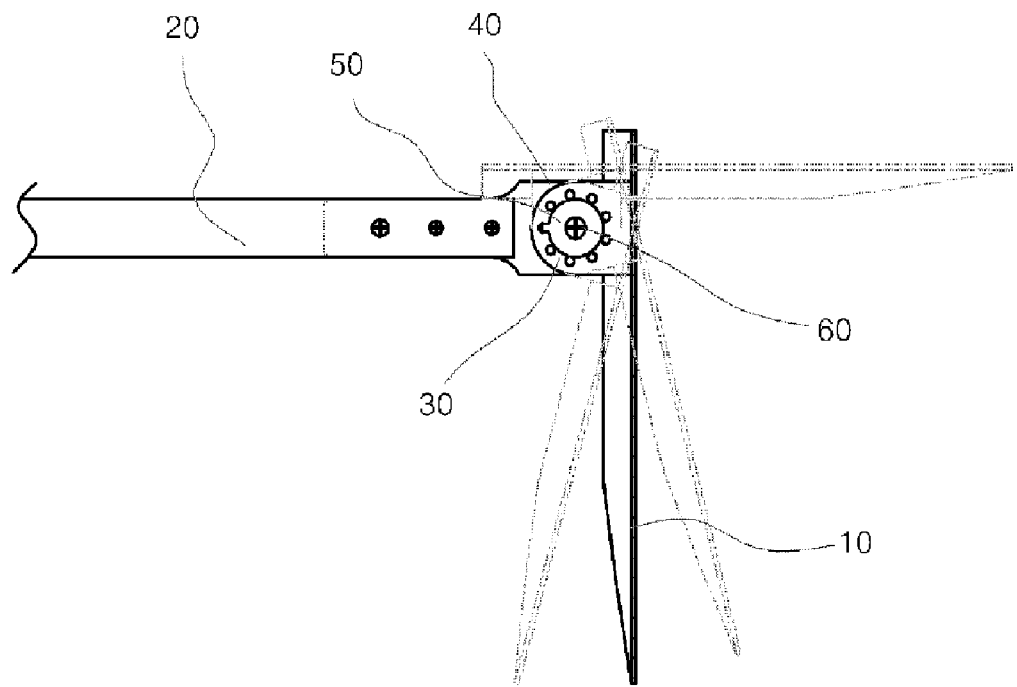
FIG. 11 is a front view illustrating angle adjustment for another usage of the present invention.
Figure 12:
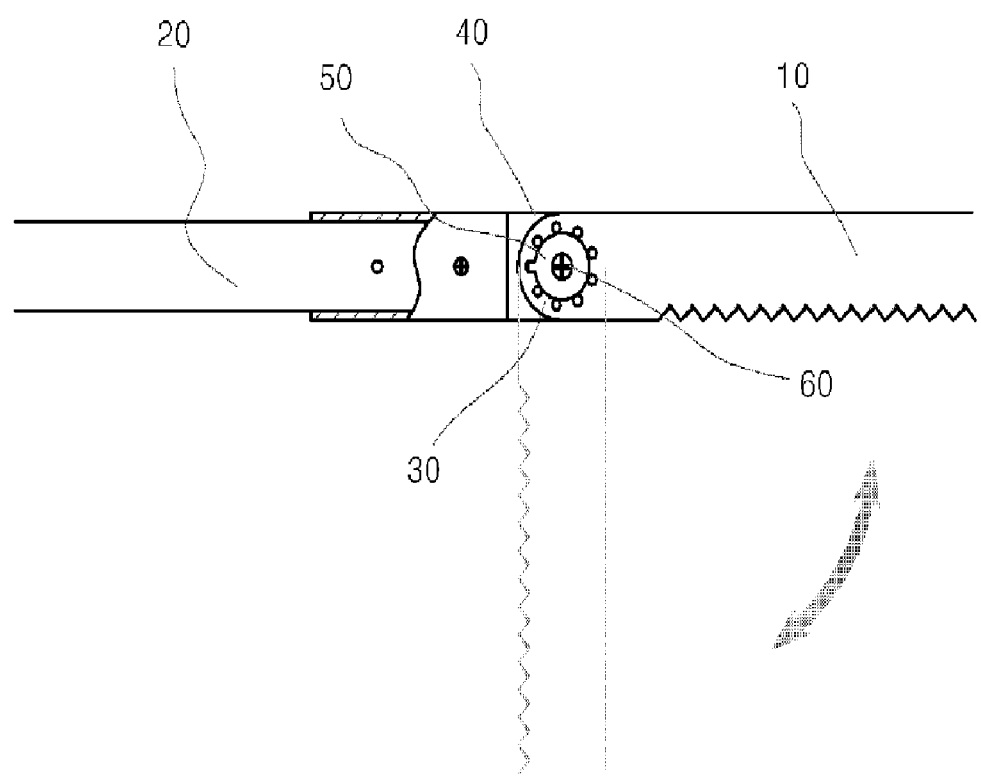
FIG. 12 is a view illustrating angle adjustment performed when the present invention is applied to a saw.
Figure 13:
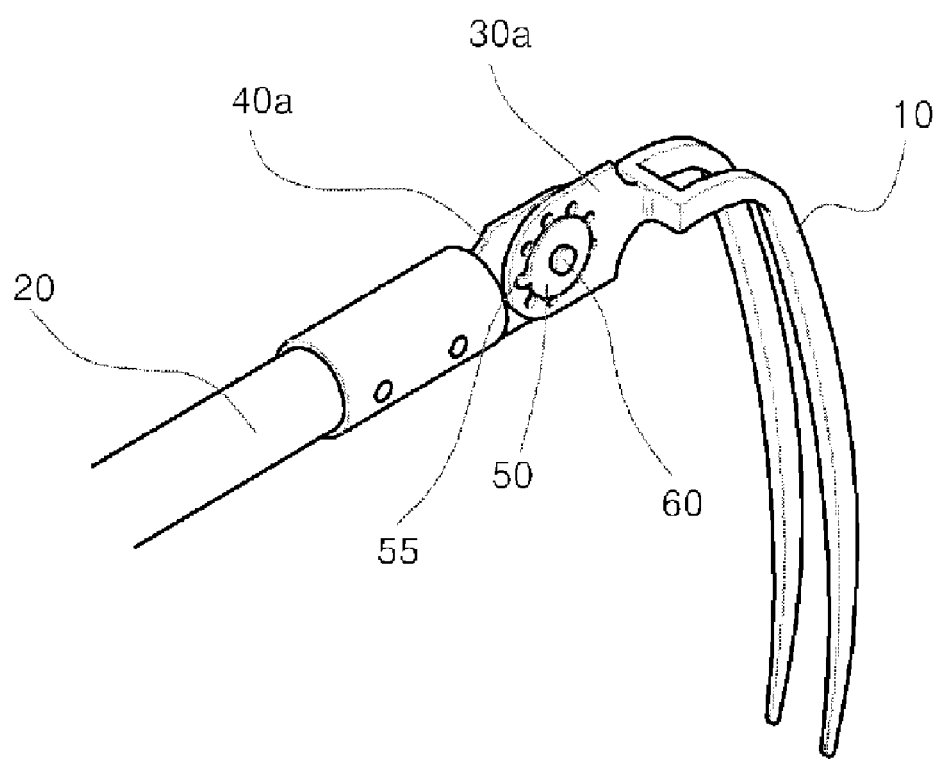
FIG. 13 is a perspective view illustrating the present invention applied to a medicinal herb-gathering hoe.
Figure 14:
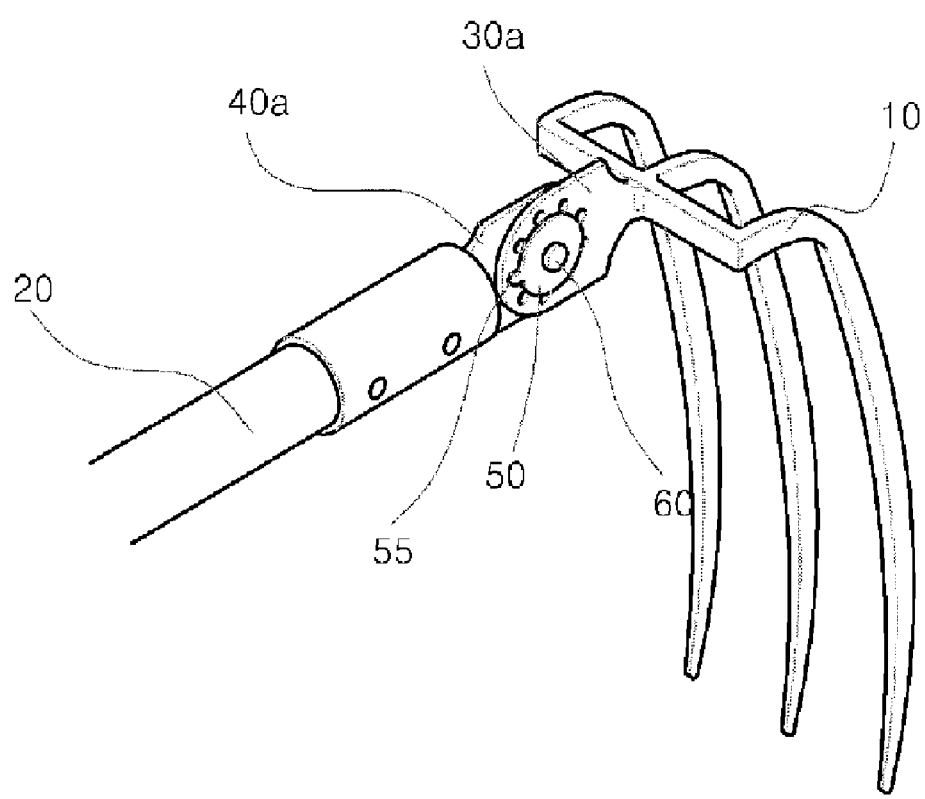
FIG. 14 is a perspective view illustrating the present invention applied to a pitchfork.
Figure 15:
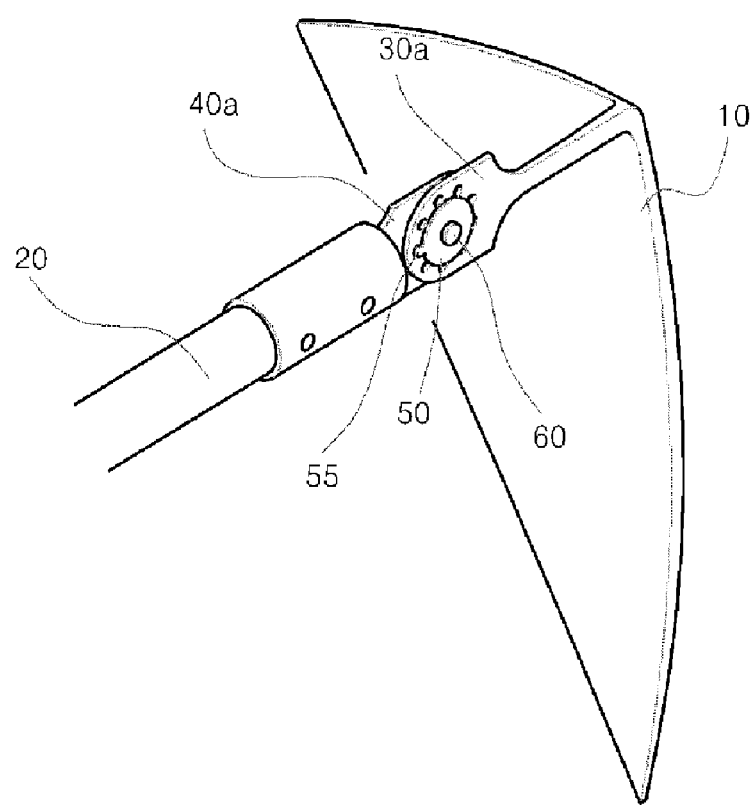
FIG. 15 is a perspective view illustrating the present invention applied to a hoe.

According to an embodiment, as shown in FIG. 5, a fixing hole 31 may be formed at the center of the connecting part 30a fixed to the working part 10, while a fixing projection 33 to be fitted into the angle adjustment holes 42 of the connecting part 40a, which is fixed to the handle 20, may be formed at the outer side of the connecting part 30a. The working part 10 is provided with the connecting part 30a having the fixing hole 31 and the fixing projection 33, and the handle 20 is provided with the connecting part 40a having a fixing hole 41 and angle adjustment holes 42. Thus, the fixing projection 33 formed on the connecting part 30a of the working part 10 is fitted into one of the angle adjustment holes 42 formed in the connecting part 40a of the handle 20, and is fixed using a fixing screw 60. The angle between the working part 10 and the handle 20 is adjusted according to the position of a hole into which the fixing projection 33 is fitted.

The present invention allows the working parts 10 of various farm tools to be coupled to the handle 20 provided with the connecting part 40, and facilitates angle adjustment.

The connecting part 30 of the working part 10 and the connecting part 40 of the handle 20 may be arranged overlapping each other and adjusted so as to have a desired angle therebetween. Then, the connecting parts may be fixed by tightening bolts into the fixing holes 31 and 41 and the angle adjustment holes 32 and 42. To eliminate inconvenience caused by fixing the connecting parts 30 and 40 with the two bolts, the present invention configured as described above employs a fixing plate 50.

After the fixing plate 50 is arranged on one side of the connecting parts 30 and 40 in an overlapping manner, the fixing projection 55 is fitted into the angle adjustment holes 32 and 42. Then, the connecting parts 30 and 40 and the fixing plate 50 are fixed by screwing the fixing screw 60 into the fixing holes 31 and 41. Thereby, the working part 10 and the handle 20 are firmly fixed to each other at a desired angle.

The working part 10 and the handle 20 of the present invention are angularly adjusted around the fixing screw 60. However, once the fixing projection 55 of the fixing plate 50 is fitted into the angle adjustment holes 32 and 42, the angle between the working part 10 and the handle 20 is kept unchanged and remains fixed. When the fixing screw 60 is tightened in this state, the handle 20 and the working part 10 are integrally fixed to each other.

Bolts may be employed in place of the fixing plate and fitted into the fixing holes 31 and 41 and the angle adjustment holes 32 and 42. When the fixing screw 60 is used, the fixing plate 50 may be coupled so as to be elastically supported by the spring 61, and thus the angle may be easily adjusted.

According to the present invention, when the fixing screw 60 is loosened and the fixing projection 55 is pulled out, the angle at which the connecting parts 30 and 40 overlap each other can be adjusted as desired. After the angle is adjusted, the fixing projection 55 may be fitted into the holes, and the fixing screw 60 may be tightened, thereby maintaining the working part 10 and the handle 20 at a desired angle. In addition, the working part 10 can be easily removed from the handle 20 and thus different working parts 10 can be connected to the same handle 20.

According to an embodiment, when the fixing screw 60 is loosened, the fixing screw 60 of the fixing plate 50 can be pulled out of the angle adjustment holes 32 and 42. At this time, the angle at which the connecting parts 30 and 40 overlap each other can be adjusted as desired. Then, the fixing projection 55 of the fixing plate 50 may be fitted into the angle adjustment holes 32 and 42 which are positioned at different angles such that the angles of the connecting parts 30 and 40 are not changed. Then, the angles are fixed using the fixing screw 60. The present invention allows the connecting parts 10 of different kinds of farm tools to be connected to the same handle 20, and allows adjustment of the angle formed between the working part 10 and the handle 20.

Therefore, different kinds of working parts 10 can be used with the handle 20, which may be long or short, by replacing one working part with another, and the angle between the working part 10 and the handle 20 can be adjusted according to working environment. Particularly, angle adjustment can be performed without restriction.

According to an embodiment of the present invention, the fixing plate 50 may not be used. Instead, the connecting part 30a formed on the working part 10 may be provided with a fixing hole 31 and a fixing projection 33. Using the fixing hole 31 and the fixing projection 33, the angle between the connecting part 30a and the connecting part 40a of the handle 20 may be adjusted and fixed. This method has a limitation in the adjustment operation unlike the angle adjustment method described above, but may facilitate replacement of the working part 10, and also facilitate adjustment of the angle between the working part 10 and the handle 20.

In this embodiment, when the fixing screw 60 is loosened, the fixing projection 33 formed on the connecting part 30*a* of the working part 10 is released from the angle adjusting hole 42 formed in the connecting part 40*a* of the handle 20. Then, the connecting parts 30*a* and 40*a* are turned such that the working part 10 and the handle 20 are arranged at a desired angle. Then, the fixing projection 33 is fitted into the angle adjustment hole 42 and then the fixing screw 60 is tightened to complete angle adjustment.

According to the embodiment, the fixing projection 55 of the fixing plate 50 may be released from holes by pressing the spring 61, and may be positioned at desired adjustment holes 32 and 42 and fixed while compressing the spring 61. Thereby, angle adjustment may be easily performed.

When the working part 10 needs to be replaced, the fixing screw 60 may be loosened and a new working part 10 may be positioned and fixed.

As described above, the present invention allows use of working parts 10 of various farm tools and hand tools using one handle 20 provided with the connecting part 40*a*, and also allows the angle between the working part 10 and the handle 20 to be adjusted as desired.

INDUSTRIAL APPLICABILITY

The angle adjustable connecting part of the present invention for farm equipment and hand tools allows a handle to be connected to different working parts of the farm equipment and hand tools and also allows the angle formed between the working part and the handle to be adjusted by positioning the angle adjustment holes formed in the working part and the handle at different angles, thereby facilitating angle adjustment. Accordingly, handles of different lengths may be employed as desired, and be positioned at an optimum angle for work. Thus, work efficiency may be enhanced. Particularly, as a unified connecting part which can be applied to any farm tools is employed, the present invention has high industrial applicability.

The invention claimed is:

1. An angle adjustable connecting part for farm tools and hand tools, comprising:
    a first connecting part fixed to a side of a working part into which a handle is fitted, the first connecting part having a fixing hole formed at a center thereof and a plurality of first angle adjustment holes arranged in a circle centered on the fixing hole;
    a second connecting part fixedly fitted onto a side of the handle into which the working part is fitted, the second connecting part having a fixing hole formed at a center thereof and a plurality of second angle adjustment holes arranged in a circle centered on the fixing hole;
    a fixing plate having a fixing hole formed at a center thereof and a fixing projection formed at an outer side thereof to be fitted into the first and second angle adjustment holes of the first and second connecting parts; and
    a fixing screw fitted into and fixed to the fixing holes when the fixing projection of the fixing plate is fitted into the first and second angle adjustment holes of the first and second connecting parts with the first connecting part of the working part, the second connecting part of the handle and the fixing plate overlapping one another,
    wherein an angle formed between the first angle adjustment holes of the first connecting part fixed to the working part is different from an angle formed between the second angle adjustment holes of the second connecting part fixed to the handle and the first angle adjustment holes of the first connecting part are arranged in an asymmetrical manner with respect to the second angle adjustment holes of the second connecting part such that one of the first angle adjustment holes of the first connecting part and one of the second angle adjustment holes of the second connecting parts are coincident with each other and other holes of the first angle adjustment holes and other holes of the second angle adjustment holes are not coincident with each other when the first connecting part and the second connecting part are arranged overlapping each other and the fixing projection of the fixing plate is fitted into the one of the first angle adjustment holes of the first connecting part and the one of the second angle adjustment holes of the second connecting part,
    wherein the first connecting part fixed to the working part and the second connecting part fixed to the handle are arranged overlapping each other, and the fixing plate is arranged on a side surface of the first and second connecting parts in an overlapping manner.

2. The angle adjustable connecting part according to claim 1, further comprising:
    a spring interposed between the fixing plate and the fixing screw to fix the connecting parts using the fixing screw.

3. An angle adjustable connecting part for farm tools and hand tools, comprising:
    a first connecting part formed on a side of a working part to which a handle is coupled, the first connecting part having a fixing hole formed at a center thereof and a plurality of first angle adjustment holes arranged in a circle centered on the fixing hole;
    a second connecting part formed on a side of the handle to which the working part is coupled, the second connecting part having a fixing hole formed at a center thereof and a plurality of second angle adjustment holes arranged in a circle centered on the fixing hole;
    a fixing plate having a fixing hole formed at a center thereof and a fixing projection formed at an outer side thereof to be fitted into the first and second angle adjustment holes of the first and second connecting parts; and
    a fixing screw fitted into and fixed to the fixing holes when the fixing projection of the fixing plate is fitted into the first and second angle adjustment holes of the first and second connecting parts with the first connecting part of the working part, the second connecting part of the handle and the fixing plate overlapping one another,
    wherein an angle formed between the first angle adjustment holes of the first connecting part formed at the working part is different from an angle formed between the second angle adjustment holes of the second connecting part formed at the handle and the first angle adjustment holes of the first connecting part are arranged in an asymmetrical manner with respect to the second angle adjustment holes of the second connecting part such that one of the first angle adjustment holes of the first connecting part and one of the second angle adjustment holes are coincident with each other and other holes of the first angle adjustment holes and other holes of the second angle adjustment holes are not coincident with each other when the first connecting part and the second connecting part are arranged overlapping each other and the fixing projection of the fixing plate is fitted into the one of the first angle adjustment holes of the first connecting part and the one of the second angle adjustment holes of the second connecting part, wherein the first connecting part formed at the working part and the second connecting part formed at the handle are arranged overlapping each other, and the fixing plate is arranged on a side surface of the first and second connecting parts in an overlapping manner.

* * * * *